(12) United States Patent
Liu et al.

(10) Patent No.: US 8,522,046 B2
(45) Date of Patent: Aug. 27, 2013

(54) METHOD, APPARATUS AND SYSTEM FOR ACQUIRING SERVICE BY PORTABLE DEVICE

(75) Inventors: Wei Liu, Shenzhen (CN); Lei Xie, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 13/579,434

(22) PCT Filed: Dec. 1, 2010

(86) PCT No.: PCT/CN2010/079346
§ 371 (c)(1),
(2), (4) Date: Aug. 16, 2012

(87) PCT Pub. No.: WO2012/009922
PCT Pub. Date: Jan. 26, 2012

(65) Prior Publication Data
US 2012/0317422 A1   Dec. 13, 2012

(30) Foreign Application Priority Data

Jul. 23, 2010   (CN) .......................... 2010 1 0239096

(51) Int. Cl.
*H04L 29/06*   (2006.01)
*H04L 9/32*   (2006.01)

(52) U.S. Cl.
USPC ............ 713/189; 713/176; 709/203; 455/410

(58) Field of Classification Search
None
See application file for complete search history.

(56) References Cited

U.S. PATENT DOCUMENTS

2001/0051515 A1* 12/2001 Rygaard ................... 455/410
2003/0037099 A1* 2/2003 Rygaard ................... 709/203
(Continued)

FOREIGN PATENT DOCUMENTS

| CN | 1592197 A | 3/2005 |
| CN | 101141258 A | 3/2008 |

(Continued)

OTHER PUBLICATIONS

International Search Report in international application No. PCT/CN2010/079346, mailed on May 5, 2011.

(Continued)

*Primary Examiner* — Shin-Hon Chen
(74) *Attorney, Agent, or Firm* — Oppedahl Patent Law Firm LLC (57) ABSTRACT

The disclosure provides a method, an apparatus and a system for acquiring a service by a portable device, in order to solve the problem that the security of the user information saved in the portable device is affected as the portable device uses an illegal User Interface (UI) on a Personnel Computer (PC) in the related art. The method includes: the portable device receives the data information of each slice computed by the UI according to the first algorithm in the UI itself and identification information of each slice saved, matches the received data information of each slice with the corresponding data information of each slice saved in the portable device itself, and verifies whether the UI is legal according to the matching result. When using a UI, the portable device sends slice information of a file to the UI to verify the legality of the UI, and does not acquire the service through the UI until the verification is passed, so as to prevent the portable device from using an illegal UI and ensure the security of the user information saved in the portable device.

11 Claims, 6 Drawing Sheets

(56) References Cited

U.S. PATENT DOCUMENTS

| | | |
|---|---|---|
| 2004/0243801 A1 | 12/2004 | Chen |
| 2005/0149737 A1 | 7/2005 | Driscoll |
| 2005/0275661 A1* | 12/2005 | Cihula et al. ............ 345/619 |
| 2006/0190996 A1 | 8/2006 | Korkishko |
| 2010/0275026 A1* | 10/2010 | McLean .................. 713/176 |

FOREIGN PATENT DOCUMENTS

| | | |
|---|---|---|
| CN | 101426200 A | 5/2009 |
| EP | 1696360 A1 | 8/2006 |
| WO | 0217048 A2 | 2/2002 |
| WO | 2005066736 A1 | 7/2005 |

OTHER PUBLICATIONS

English Translation of the Written Opinion of the International Search Authority in international application No. PCT/CN2010/079346, mailed on May 5, 2011.

Supplementary European Search Report in European application No. 10854952.8, mailed on Jun. 17, 2013.

* cited by examiner

METHOD, APPARATUS AND SYSTEM FOR ACQUIRING SERVICE BY PORTABLE DEVICE

TECHNICAL FIELD

The disclosure relates to the technical field of mobile broadband, in particular to a method, an apparatus and a system for acquiring a service by a portable device.

BACKGROUND

According to a request from an operator, a device manufacturer provides the operator with a corresponding universal portable device, and also develops a legal User Interface (UI) for the universal portable device. When the portable device is connected through a data line to a computer where the legal UI is located, a user may acquire a corresponding service through the legal UI. For example, when the legal UI is a short message UI, the user may send a short message through the short message UI; and when the short message UI identifies the portable device, it sends a use request to the portable device, and the portable device sends a short message to another portable device through the short message UI.

The portable device is connected to a Personal Computer (PC) through a data line and implements a corresponding service through a UI on the PC, however, when the UI on the PC is illegal and the user uses the illegal UI to acquire the service, the illegal UI may steal user information saved in the portable device and upload the user information to an illegal server, thereby affecting the security of the user information saved in the portable device.

SUMMARY

In view of this, the embodiments of the disclosure provide a method, an apparatus and a system for acquiring a service by a portable device, so as to solve the problem that the security of user information saved in a portable device is affected when the portable device uses an illegal UI on a PC in the related art.

A method for acquiring a service by a portable device provided by one embodiment of the disclosure includes:

when a user uses a User Interface (UI) to acquire a service, receiving, by a portable device, a checking application from the UI which sends the checking application after identifying the portable device, wherein the checking application contains information of a file to be checked;

acquiring, by the portable device, the file according to the information of the file, and returning, by the portable device, identification information of at least one slice of the file to the UI;

receiving, by the portable device, data information of each slice in the at least one slice returned by the UI, and matching, by the portable device, the received data information of the each slice with corresponding data information of each slice saved in the portable device itself, wherein the data information of the each slice received by the portable device is computed by the UI according to a first algorithm saved in the UI and the identification information of the each slice; and when they are successfully matched, determining, by the portable device, that the UI is legal, and acquiring, by the portable device, the service through the UI; otherwise, refusing, by the portable device, to use the UI.

An apparatus for acquiring a service by a portable device provided by one embodiment of the disclosure includes:

a receiving module which is configured to receive a checking application from a User Interface (UI) which sends the checking application after identifying a portable device, and receive data information of each slice, which is returned by the UI and computed according to a first algorithm saved in the UI and identification information of the each slice;

a sending module which is configured to return identification information of at least one slice of a file to be checked to the UI; and a verifying module which is configured to match the data information of the each slice returned by the UI with corresponding data information of each slice saved in the verifying module itself; when they are matched successfully, determine that the UI is legal and acquire the service through the UI; otherwise, refuse to use the UI.

A system for acquiring a service by a portable device provided by one embodiment of the disclosure includes:

a portable device which is configured to, when a user uses a User Interface (UI) to acquire a service, receive a checking application containing information of a file to be checked from the UI which sends the checking application after identifying the portable device; acquire the file according to the information of the file; return identification information of at least one slice of the file to the UI; receive data information of each slice in the at least one slice returned by the UI; match the received data information of the each slice with corresponding data information of each slice saved in the portable device itself, and when they are matched successfully, determine that the UI is legal and acquire the service through the UI, otherwise, refuse to use the UI; and the UI, which is configured to send the checking application containing the information of the file to be checked after identifying the portable device, receive the identification information of the at least one slice of the file returned by the portable device; compute data information of the each slice according to a first algorithm saved in the UI itself and the identification information of the each slice; and send the data information of the each slice to the portable device.

The embodiments of the disclosure provide the method, apparatus and system for acquiring a service by a portable device. In the method, a portable device receives data information of each slice computed by a UI according to a first algorithm saved in the UI itself and identification information of each slice, matches the received data information of the each slice with corresponding data information of each slice saved in the portable device itself, and verifies whether the UI is legal according to the matching result. When using a UI, the portable device sends slice information of a file to the UI to verify the legality of the UI, and does not acquire a service through the UI until the verification is passed, thereby preventing the portable device from using an illegal UI and ensuring the security of user information saved in the portable device.

DETAILED DESCRIPTION

The embodiments of the disclosure provide a method, an apparatus and a system for acquiring a service by a portable device. The portable device receives data information of each slice computed by a UI according to the first algorithm saved in the UI itself and identification information of the each slice, matches the received data information of the each slice with corresponding data information of each slice saved in the portable device itself, and verifies whether the UI is legal according to the matching result. When using the UI, the portable device sends slice information of a file to the UI to verify the legality of the UI, and does not acquire a service through the UI until the verification is passed, thereby preventing the portable device from using an illegal UI and ensuring the security of user information saved in the portable device.

The embodiments of the disclosure are described below in conjunction with the drawings in detail.

Figure 1:
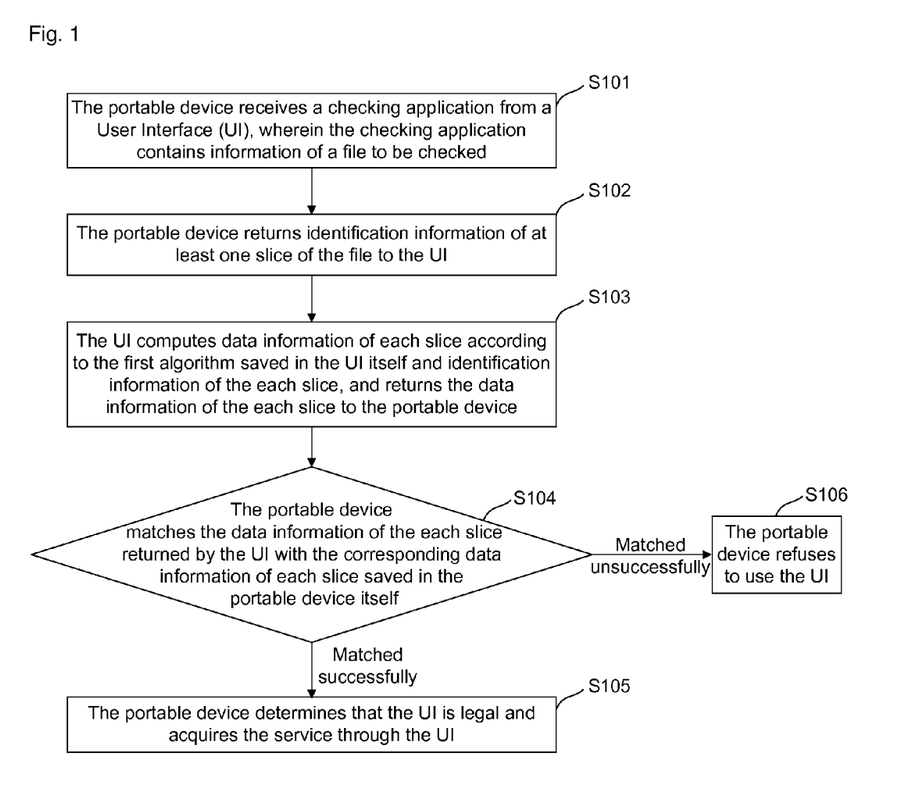
FIG. 1 shows a process of acquiring a service by a portable device in one embodiment of the disclosure.

FIG. 1 shows a process of acquiring a service by a portable device in one embodiment of the disclosure, including the following steps.

S101: The portable device receives a checking application from a UI which sends the checking application after identifying the portable device, wherein the checking application contains information of a file to be checked.

In the embodiment of the disclosure, the legality of the UI needs to be verified, therefore, the UI, after identifying the portable device, determines that the portable device is available and sends a checking application to the portable device; wherein the checking application contains information of a file to be checked, such as digital certificate information or file information of an interface program.

S102: The portable device acquires the file according to the information of the file, and returns identification information of at least one slice of the file to the UI.

In the embodiment of the disclosure, the portable device saves a plurality of files and segments each file to obtain a plurality of slices of the each file, for example, the portable device may save at least 100 slices of one file. The portable device may randomly send identification information of at least one slice of the file to the UI, therefore, the more the slices of the file saved by the portable device are, the more precise the verification for the legality of the UI is.

When receiving the checking application returned by the UI, the portable device acquires a corresponding file according to information of a file in the checking application, and randomly returns identification information of at least one slice of the corresponding file to the UI; wherein identification information of the at least one slice returned by the portable device may contain a start mark and an end mark of the at least one slice.

S103: The UI computes data information of each slice according to the first algorithm saved in the UI itself and identification information of each slice, and returns the data information of the each slice to the portable device.

In the embodiment of the disclosure, each UI saves a corresponding first algorithm, and when receiving identification information of at least one slice from the portable device, the UI computes data information of each slice in the at least one slice according to the first algorithm saved in the UI itself.

S104: The portable device receives the data information of the each slice returned by the UI to match the data information with corresponding data information of each slice saved in the portable device itself; when they are matched successfully, step S105 is executed; otherwise, step S106 is executed.

In the embodiment of the disclosure, the portable device saves a plurality of files and segments each file to obtain a plurality of slices of the each file. The portable device may save data information of each slice of the each file.

Or, after the portable device randomly returns identification information of at least one slice of a file requested by the UI to the UI, the UI computes data of each slice in the at least one slice according to the first algorithm saved in the UI itself and identification information of the each slice in the at least one slice.

When receiving the data information of the each slice returned by the UI and corresponding data information of each slice saved in the portable device itself, the portable device can verify the legality of the UI.

S105: The portable device determines that the UI is legal and acquires a service through the UI.

When the UI is legal, the UI can correctly compute data information of each slice according to the first algorithm saved by the UI itself and identification information of the each slice. That is, only the first algorithm saved by a legal UI can be a legal algorithm preset by a manufacturer.

S106: The portable device determines that the UI is illegal and refuses to use the UI.

When the UI is illegal, the UI cannot correctly compute data information of each slice according to the first algorithm saved in the UI itself and identification information of the each slice.

In the above process, the portable device receives the data information of the each slice computed by the UI according to the first algorithm saved in the UI itself and the identification information of the each slice, matches the received data information of the each slice with the corresponding data information of each slice saved in the portable device itself, and verifies whether the UI is legal according to a matching result. The illegal UI does not have a legal algorithm preset by the operator, therefore, the illegal UI cannot correctly compute the data information of the each slice, thereby failing to pass the verification. Therefore, the portable device can only use a legal UI in the embodiment of the disclosure, thereby ensuring the security of the user data saved in the portable device. Meanwhile, since the portable device can only use a legal UI, the interests of the device manufacturer and operator can be ensured.

In the embodiment of the disclosure, in order to further reinforce the security of a service, after the portable device determines that the UI is legal and before the portable acquires the service through the UI, the method further includes: the portable device judges whether to authenticate permission to use the service in the process of acquiring the service according to attribute information of the service to be acquired.

Figure 2:
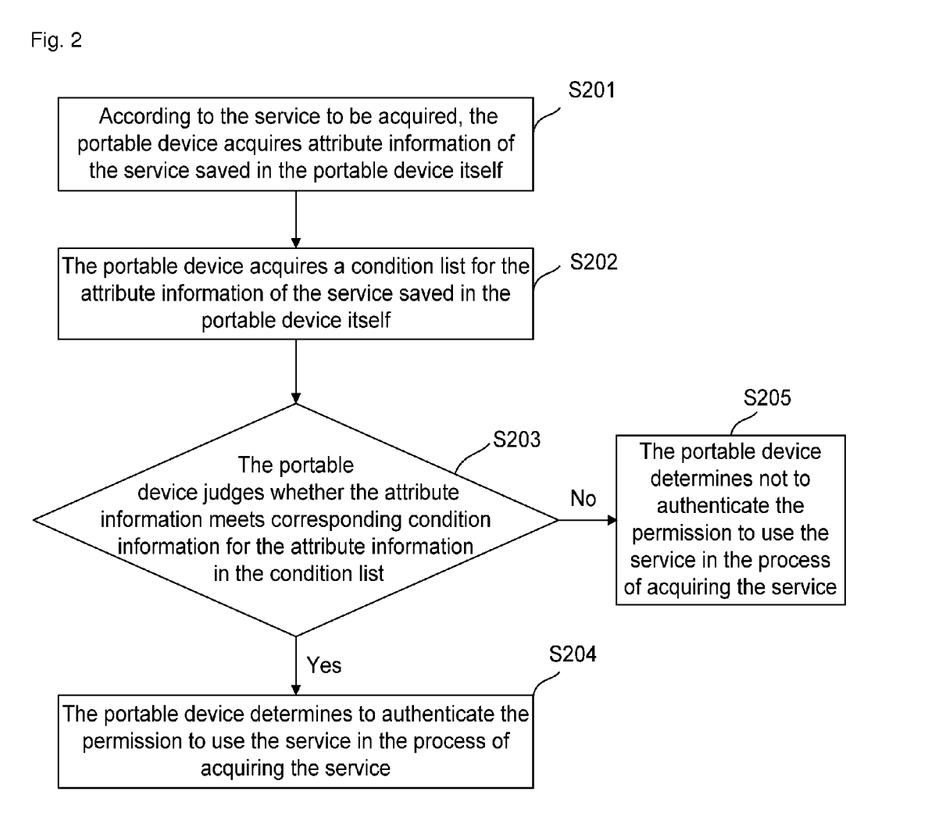
FIG. 2 shows a process of judging by a portable device whether to authenticate permission to use a service in the process of acquiring the service in one embodiment of the disclosure.

FIG. 2 shows a process of judging by the portable device whether to authenticate the permission to use the service in the process of acquiring the service in one embodiment of the disclosure, specifically including the following steps.

S201: According to the service to be acquired, the portable device acquires attribute information of the service saved in the portable device itself.

The portable device saves various attribute information for each service, which may be one or more of name information, type information, identification information and security level information of the service.

S202: The portable device acquires a condition list for the attribute information of the service saved in the portable device itself.

The portable device saves the condition list for attribute information of each service by itself; the condition list for the attribute information of each service contains condition information for verifying the attribute information, and the condition information is used for judging whether to authenticate the permission to use the service in the process of acquiring the service. The portable device can determine the attribute information of the service as well as the condition list for the attribute information of the service according to the service to be acquired.

S203: The portable device judges whether the attribute information of the service meets corresponding condition information for the attribute information in the condition list, if the attribute information meets the condition information, S204 is executed, otherwise, S205 is executed.

For example, when the attribute information is the name information of the service to be acquired, if condition information for the name information contains name information of the service in the condition list for the attribute information of the service, then it is determined that the attribute information of the service meets the condition information in the condition list; and when the condition information for the name information does not contain the name information of the service, it is determined that the attribute information of the service does not meet the condition information in the condition list.

When the attribute information is the security level information of the service to be acquired, if the security level information meets condition information for the security level information in the condition list for the attribute information of the service, then it is determined that the attribute information of the service meets the condition information in the condition list, otherwise, it is determined that the attribute information of the service does not meet the condition information in the condition list. For example, when the condition information for the security level information is that the security level is greater than 5, if the security level of the service to be acquired is 4, which is less than 5, it is determined that the security level information of the service to be acquired does not meet the condition information for the security level information; and when the security level of the service to be acquired is 7, which is greater than 5, it is determined that the security level information of the service to be acquired meets the condition information for the security level information.

S204: The portable device determines to authenticate the permission to use the service in the process of acquiring the service.

S205: The portable device determines not to authenticate the permission to use the service in the process of acquiring the service.

In the embodiment of the disclosure, for some important services, the permission to use the services is authenticated by the portable device, for example, the important services may be a short message service or a Global Positioning System (GPS) service.

When it is determined that the service to be acquired by the portable device is important, the portable device needs to verify the permission to use the service in the service process. It is mainly because that the portable device uses a UI on a PC through a data line, which may cause insecurity when used for connection, for example, when the portable device determines a UI to be legal after performing verification on the UI and then acquires a service through the UI, since a certain period of time is needed for this service acquisition, during which if the portable device is replaced by another portable device but the UI is continued to be used, the UI cannot know whether the current portable device has the permission to use it. Therefore, in order to improve the security in a service acquisition process, in the disclosure, for some important services, it is necessary to verify whether the portable device has the permission to use the UI in the service acquisition process.

Or, in order to improve the security of the use of a UI by the portable device, in the embodiment of the disclosure, it may be needed to verify whether the portable device has the permission to use a UI in the process of acquiring a service through each UI.

Figure 3:
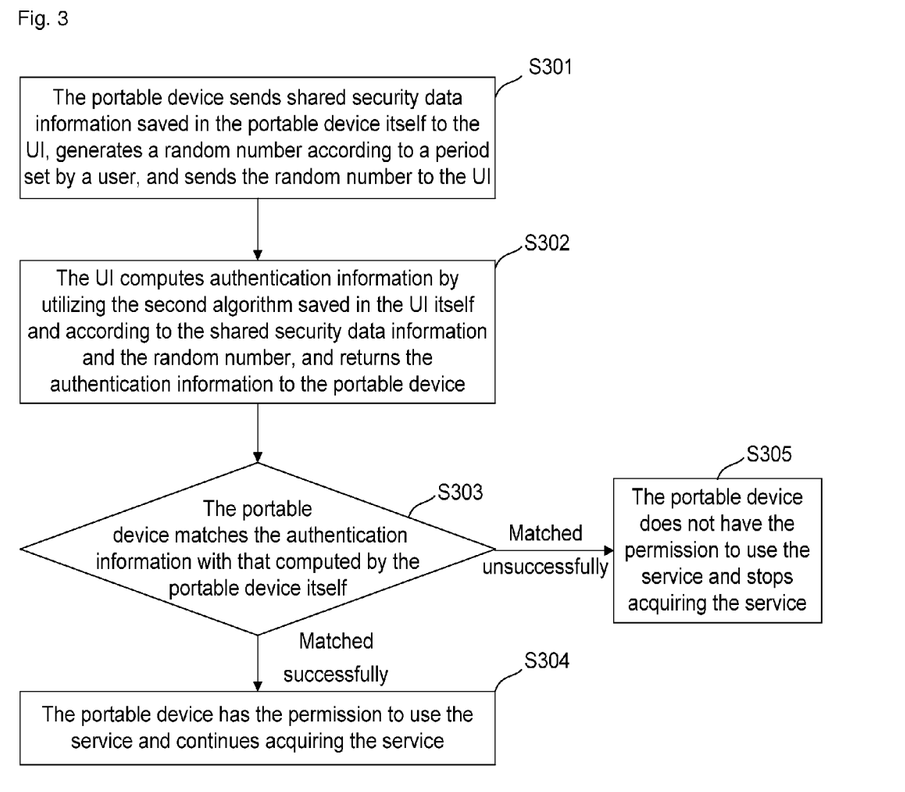
FIG. 3 shows a process of authenticating permission to use a service by a portable device in the process of acquiring the service in one embodiment of the disclosure.

FIG. 3 shows a process of authenticating the permission to use a service by a portable device in the process of acquiring the service in one embodiment of the disclosure, specifically including the following steps.

S301: The portable device sends shared security data information saved in the portable device itself to the UI, generates a random number according to a period set by the user, and sends the random number to the UI.

The shared security data information is saved by the portable device itself, and may be the unique shared security data information set by the factory or set by the user.

When receiving the shared security data information, the UI saves it, and the shared security data information saved by the UI is unchanged during a process that the portable device acquires the service through the UI.

S302: The UI computes authentication information by using the second algorithm saved in the UI itself and according to the shared security data information and the random number, and returns the authentication information to the portable device.

S303: The portable device matches the authentication information with that computed by itself by using the algorithm saved in the portable device itself and according to the shared security data and the random number; when they are matched successfully, S304 is executed, otherwise, S305 is executed.

The second algorithm saved by the UI is the same as that saved by the portable device.

Shared security data saved by each portable device are different, and the shared security data information saved by the UI is unchanged during the process that the portable device acquires the service, therefore, when the portable device acquires the service, if the portable device is replaced with another portable device, the authentication information computed by the UI according to the shared security data and the random number saved is not consistent with that computed by another portable device according to shared security data and a random number saved in the another portable device itself, as a result, the matching is failed and the verification cannot be passed.

S304: The portable device has the permission to use the service and continues acquiring the service.

S305: The portable device does not have the permission to use the service and stops acquiring the service.

During the process of acquiring a service through a UI, the portable device needs to encrypt service data information used for acquiring the service through the UI, and sends the encrypted service data information to the UI to instruct the UI to decrypt the encrypted service data information and provide the service through the decrypted service data information.

The process is described below in detail with a short message service as an example.

Figure 4:
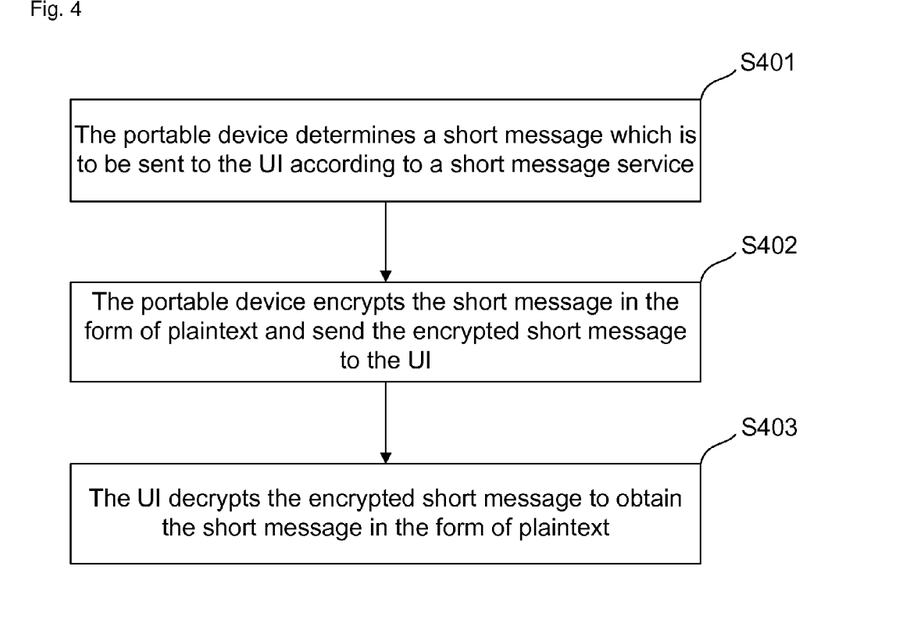
FIG. 4 shows a process of encrypting and decrypting service data information by a portable device in the process of acquiring a short message service through a UI in one embodiment of the disclosure.

FIG. 4 shows a process of encrypting and decrypting service data information by a portable device in the process of acquiring a short message service through a UI in one embodiment of the disclosure, specifically including the following steps.

S401: The portable device determines a short message which is to be sent to the UI according to the short message service.

The short message is in the form of plaintext.

S402: The portable device encrypts the short message in the form of plaintext and sends the encrypted short message to the UI.

The portable device encrypts the short message in the form of plaintext by utilizing an encryption algorithm saved in the portable device itself to generate short message cyphertext and a group of decryption passwords, and sends the short message cyphertext and the decryption passwords to the UI.

S403: The UI decrypts the encrypted short message to obtain the short message in the form of plaintext.

The UI decrypts the encrypted short message by utilizing a decryption algorithm saved in the portable device itself according to the received short message cyphertext and decryption passwords to obtain the short message in the form of plaintext.

In the process above, the portable device is connected to a PC through a data line and acquires a service through a UI on the PC, therefore, when the portable device acquires the service through the UI, if service data information of the service contains some important information of the user, the portable device encrypts the service data information used for acquiring the service through the UI according to the encryption algorithm saved in the portable device itself and then sends the encrypted service data information to the UI, in order to prevent hacker software and other illegal software from stealing important information, and ensure the security of the service data information transmitted between the portable device and the UI, during the process of acquiring the service through the UI. The UI also decrypts the encrypted service data information according to a corresponding decryption algorithm saved in the UI itself, and provides the service through the decrypted service data information, thus further improving the security of the service data information transmitted between the portable device and the UI.

The abovementioned implementing process is described below by a specific implementation mode in detail.

Figure 5:
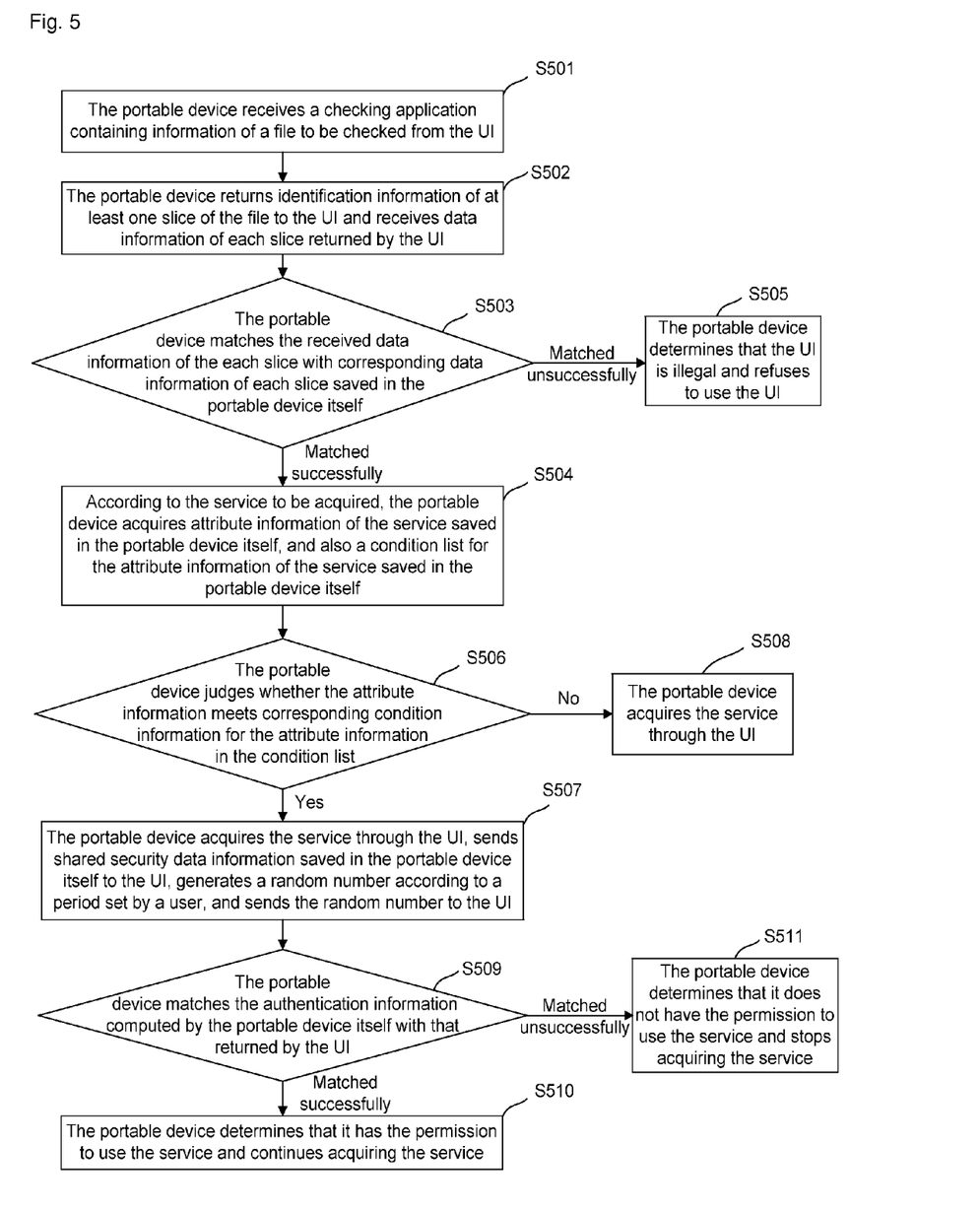
FIG. 5 shows a detailed process of acquiring a service by a portable device in one embodiment of the disclosure.

FIG. 5 shows a detailed process of acquiring a service by a portable device in one embodiment of the disclosure, specifically including the following steps.

S501: The portable device receives a checking application containing information of a file to be checked from a UI which sends the checking application after identifying the portable device when a user uses the UI to acquire a service.

S502: The portable device acquires the file according to the information of the file, returns identification information of at least one slice of the file to the UI, and receives data information of each slice in the at least one slice returned by the UI.

The data information of the each slice returned by the UI is computed by the UI according to the first algorithm in the UI itself and identification information of the each slice saved.

S503: The portable device matches the received data information of the each slice with corresponding data information of each slice saved in the portable device itself; when they are matched successfully, S504 is executed; otherwise, S505 is executed.

S504: According to the service to be acquired, the portable device acquires attribute information of the service saved in the portable device itself, and also acquires a condition list for the attribute information of the service saved in the portable device itself.

After the portable device determines that the UI is legal, then it verifies whether to authenticate the permission to use the service in the process of acquiring the service before acquiring the service through the UI.

The attribute information of the service includes one or more of name information, type information, identification information and security level information of the service; and the condition list contains condition information for verifying each type of attribute information.

S505: The portable device determines that the UI is illegal and refuses to use the UI.

S506: The portable device judges whether the attribute information of the service meets corresponding condition information for the attribute information in the condition list; if the attribute information meets the corresponding condition information, step S507 is executed, otherwise, step S508 is executed.

S507: The portable device acquires the service through the UI, and sends shared security data information saved in the portable device itself to the UI, generates a random number according to a period set by the user and sends the random number to the UI in the process of acquiring the service.

The portable device determines to authenticate the permission to use the service in the process of acquiring the service.

S508: The portable device acquires the service through the UI.

The portable device determines not to authenticate the permission to use the service in the process of acquiring the service.

S509: The portable device computes authentication information according to an algorithm saved in the portable device itself, the shared security data information and the random number, matches the authentication information with that returned by the UI; when they are matched successfully, step S510 is executed, otherwise, step S511 is executed.

The authentication information returned by the UI is computed by the UI according to the second algorithm saved in the UI itself, the shared security data information and the random number.

S510: The portable device determines that it has the permission to use the service and continues acquiring the service.

S511: The portable device determines that it does not have the permission to use the service and stops acquiring the service.

In the process above, the portable device receives data information of each slice computed by the UI according to the first algorithm saved in the UI itself and identification information of the each slice, matches the received data information of the each slice with corresponding data information of each slice saved in the portable device itself, and verifies whether the UI is legal according to the matching result, thereby preventing the portable device from using an illegal UI and ensuring the security of user information saved in the portable device.

After the UI is verified to be legal, and before the service is acquired, whether to verify the permission to use the service in the process of acquiring the service is verified according to the attribute information of the service; when determining to verify the permission to use the service in the process of acquiring the service, the portable device verifies whether it has the permission to use the service according to the shared security data information and the random number sent to the UI in the process of acquiring the service, thereby further reinforcing the security of the service.

Furthermore, when the portable device acquires the service through the UI, in order to prevent hacker software from stealing important information in service data information transmitted between the portable device and the UI, and improve the security of data transmission, the portable device encrypts the service data information used for acquiring the service through the UI according to an encryption algorithm saved in the portable device itself and then sends then encrypted service data information to the UI; and the UI decrypts the encrypted service data information according to a corresponding decryption algorithm saved in the UI itself, and provides the service through the decrypted service data information, thereby further improving the security of the service data information transmitted between the portable device and the UI.

The embodiment of the disclosure provides the method for acquiring a service by a portable device, including: the portable device receives data information of each slice computed by the UI according to the first algorithm saved in the UI itself and identification information of the each slice, matches the received data information of the each slice with corresponding data information of each slice saved in the portable device itself, and verifies whether the UI is legal according to the matching result. When using the UI, the portable device sends slice information of a file to the UI to verify the legality of the UI, and does not acquire the service through the UI until the verification is passed, thereby preventing the portable device from using an illegal UI and ensuring the security of user information saved in the portable device.

Figure 6:
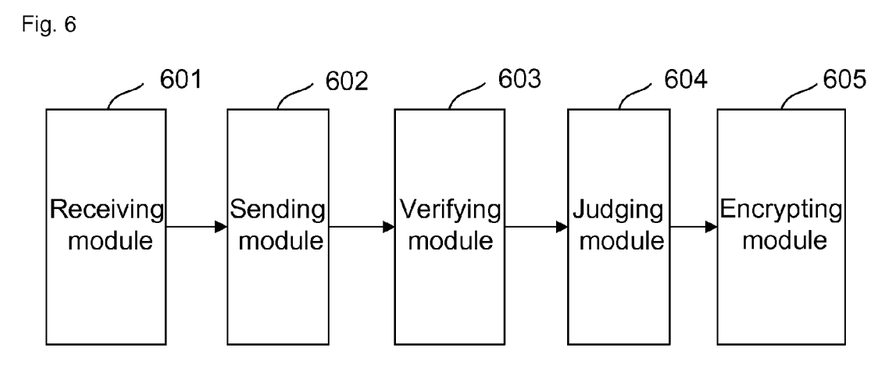
FIG. 6 shows an apparatus for acquiring a service by a portable device in one embodiment of the disclosure.

FIG. 6 shows an apparatus for acquiring a service by a portable device in one embodiment of the disclosure, specifically including:

a receiving module 601 which is configured to receive a checking application from a User Interface (UI) which sends the checking application after identifying a portable device, and receive data information of each slice which is returned by the UI and computed according to the first algorithm saved in the UI and identification information of the each slice;

a sending module 602 which is configured to return the identification information of at least one slice of a file to be checked to the UI; and a verifying module 603 which is configured to match the data information of the each slice returned by the UI with corresponding data information of each slice saved in the verifying module itself; when they are matched successfully, determine that the UI is legal and acquiring the service through the UI, otherwise, refuse to use the UI.

The apparatus further includes:

a judging module 604 which is configured to, according to the service to be acquired, acquire attribute information of the service saved in the judging module itself and a condition list for the attribute information of the service saved in the judging module itself, wherein the condition list contains condition information for verifying each type of attribute information; judge whether the attribute information of the service meets corresponding condition information for the attribute information in the condition list; and determine to authenticate the permission to use the service in the process of acquiring the service when the attribute information of the service meets the corresponding condition information; otherwise, determine not to authenticate the permission to use the service in the process of acquiring the service.

The sending module 602 is further configured to send shared security data information saved in the sending module itself to the UI, generate a random number according to a period set by the user, and send the random number to the UI;

the receiving module 601 is further configured to receive authentication information returned by the UI, wherein the authentication information returned by the UI is computed by the UI according to the second algorithm saved in the UI itself, the shared security data information and the random number; and the verifying module 603 is further configured to match authentication information computed according to an algorithm saved in the verifying module itself, the shared security data information and the random number with that returned by the UI; when they are matched successfully, determine that the verifying module itself has the permission to use the service and continue acquiring the service, otherwise, determine that it does not have the permission to use the service and stop acquiring the service.

The apparatus further includes:

an encrypting module 605 which is configured to encrypt service data information used for acquiring the service through the UI; and the sending module 602 is further configured to send the encrypted service data information to the UI to instruct the UI to decrypt the encrypted service data information and provide the service through the decrypted service data information.

Figure 7:
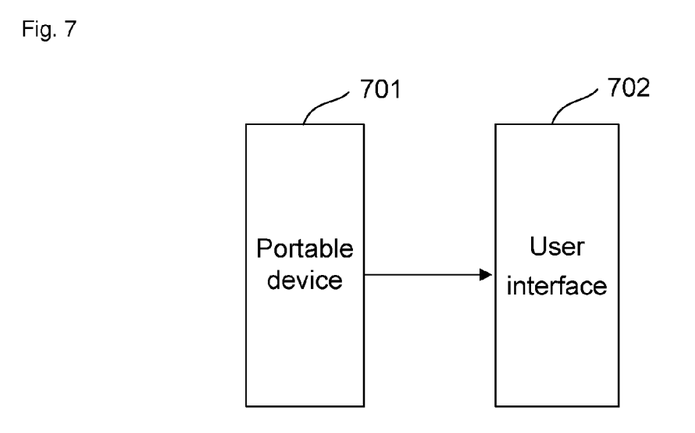
FIG. 7 shows a system for acquiring a service by a portable device in one embodiment of the disclosure.

FIG. 7 shows a system for acquiring a service by a portable device in one embodiment of the disclosure, specifically including:

a portable device 701 which is configured to, when a user uses a UI 702 to acquire a service, receive a checking application containing information of a file to be checked from the UI 702 which sends the checking application after identifying the portable device 701; acquire the file according to the information of the file; return identification information of at least one slice of the file to the UI 702; receive data information of each slice in the at least one slice returned by the UI 702; match the received data information of the each slice with corresponding data information of each slice saved in the portable device itself, and when they are matched successfully, determine that the UI 702 is legal and acquire the service through the UI 702, otherwise, refuse to use the UI 702; and the UI 702, which is configured to send the checking application containing the information of the file to be checked after identifying the portable device 701, receive the identification information of the at least one slice of the file returned by the portable device 701; compute data information of the each slice according to the first algorithm saved in the UI itself and the identification information of the each slice; and send the data information of the each slice to the portable device 701.

The embodiments of the disclosure provide the method, apparatus and system for acquiring a service by a portable device. The method includes: a portable device receives data information of each slice computed by the UI according to the first algorithm and identification information of the each slice saved in the UI itself, matches the received data information of the each slice with corresponding data information of each slice saved in the portable device itself, and verifies whether the UI is legal according to the matching result. When using a UI, the portable device sends slice information of the file to the UI to verify the legality of the UI, and does not acquire a service through the UI until the verification is passed, thereby preventing the portable device from using an illegal UI and ensuring the security of user information saved in the portable device.

Obviously, various modifications and variations for the disclosure can be made by those skilled in the art within the spirit and scope of the disclosure. By doing so, if such modifications and variations of the disclosure fall within the scope of the claims and equivalents thereof, the disclosure is intended to include such modifications and variations.

The invention claimed is:

1. A method for acquiring a service by a portable device, comprising:
   when a user uses a User Interface (UI) to acquire a service, receiving, by a portable device, a checking application from the UI which sends the checking application after identifying the portable device, wherein the checking application contains information of a file to be checked;
   acquiring, by the portable device, the file according to the information of the file, and returning, by the portable device, identification information of at least one slice of the file to the UI;
   receiving, by the portable device, data information of each slice in the at least one slice returned by the UI, and matching, by the portable device, the received data information of the each slice with corresponding data information of each slice saved in the portable device itself, wherein the data information of the each slice received by the portable device is computed by the UI according to a first algorithm saved in the UI and the identification information of the each slice;
   when they are successfully matched, determining, by the portable device, that the UI is legal, and acquiring, by the portable device, the service through the UI; otherwise, refusing, by the portable device, to use the UI; and,
   after the portable device determines that the UI is legal, and before the portable device acquires the service through the UI, the method further comprising:
   acquiring, by the portable device, attribute information of the service saved in the portable device itself according to the service to be acquired, and a condition list for the attribute information of the service saved in the portable device itself; wherein the condition list contains condition information for verifying each type of attribute information;
   judging, by the portable device, whether the attribute information of the service meets corresponding condition information for the attribute information in the condition list; when the attribute information of the service meets the corresponding condition information for the attribute information in the condition list, determining, by the portable device, to authenticate permission to use the service in a process of acquiring the service; otherwise, determining, by the portable device, not to authenticate the permission to use the service in the process of acquiring the service.

2. The method according to claim 1, wherein the attribute information of the service comprises:
   one or more of name information, type information, identification information and security level information of the service.

3. The method according to claim 2, wherein the acquiring by the portable device the service through the UI comprises:
   encrypting, by the portable device, service data information used for acquiring the service through the UI, and sending by the portable device the encrypted service data information to the UI to instruct the UI to decrypt the encrypted service data information and provide the service through the decrypted service data information.

4. The method according to claim 1, wherein the determining by the portable device to authenticate permission to use the service in a process of acquiring the service comprises:
   sending, by the portable device, shared security data information saved in the portable device itself to the UI, and generating, by the portable device, a random number according to a period set by the user, and sending, by the portable device, the random number to the UI;
   computing, by the portable device, authentication information according to an algorithm saved in the portable device itself, the shared security data information and the random number, and matching, by the portable device, the authentication information with authentication information returned by the UI, wherein the authentication information returned by the UI is computed by the UI according to a second algorithm saved in the UI itself, the shared security data information and the random number; and
   when they are matched successfully, determining, by the portable device, that it has the permission to use the service and continuing acquiring the service; otherwise, determining, by the portable device, that it does not have the permission to use the service and stopping acquiring the service.

5. The method according to claim 4, wherein the acquiring by the portable device the service through the UI comprises:
   encrypting, by the portable device, service data information used for acquiring the service through the UI, and sending by the portable device the encrypted service data information to the UI to instruct the UI to decrypt the encrypted service data information and provide the service through the decrypted service data information.

6. The method according to claim 1, wherein the acquiring by the portable device the service through the UI comprises:
   encrypting, by the portable device, service data information used for acquiring the service through the UI, and sending by the portable device the encrypted service data information to the UI to instruct the UI to decrypt the encrypted service data information and provide the service through the decrypted service data information.

7. An apparatus for acquiring a service by a portable device, comprising:
   a receiving module which is configured to receive a checking application from a User Interface (UI) which sends the checking application after identifying a portable device, and receive data information of each slice, which is returned by the UI and computed according to a first algorithm saved in the UI and identification information of the each slice ;
   a sending module which is configured to return identification information of at least one slice of a file to be checked to the UI;
   a verifying module which is configured to match the data information of the each slice returned by the UI with corresponding data information of each slice saved in the verifying module itself; when they are matched successfully, determine that the UI is legal and acquire the service through the UI; otherwise, refuse to use the UI; and
   a judging module which is configured to acquire attribute information of the service saved in the judging module itself according to the service to be acquired, and acquire a condition list for the attribute information of the service saved in the judging module itself, wherein the condition list contains condition information for verifying each type of attribute information; judge whether the attribute information of the service meets corresponding condition information for the attribute information in the condition list; and when the attribute information of the service meets the corresponding condition information for the attribute information in the condition list, determine to authenticate permission to use the service in a process of acquiring the service; otherwise, determine not to authenticate the permission to use the service in the process of acquiring the service.

8. The apparatus according to claim 7, wherein the sending module is further configured to send shared security data information saved in the sending module itself to the UI, generate a random number according to a period set by the user, and send the random number to the UI;

the receiving module is further configured to receive authentication information returned by the UI, wherein the authentication information returned by the UI is computed by the UI according to a second algorithm saved in the UI itself, the shared security data information and the random number; and the verifying module is further configured to match authentication information computed according to an algorithm saved in the verifying module itself, the shared security data information and the random number with the authentication information returned by the UI; when they are matched successfully, determine that the verifying module itself has the permission to use the service and continue acquiring the service; otherwise, determine that the verifying module itself does not have the permission to use the service and stop acquiring the service.

9. The apparatus according to claim 8, further comprising:

an encrypting module which is configured to encrypt service data information used for acquiring the service through the UI; and the sending module is further configured to send the encrypted service data information to the UI to instruct the UI to decrypt the encrypted service data information and provide the service through the decrypted service data information.

10. The apparatus according to claim 7, further comprising:

an encrypting module which is configured to encrypt service data information used for acquiring the service through the UI; and the sending module is further configured to send the encrypted service data information to the UI to instruct the UI to decrypt the encrypted service data information and provide the service through the decrypted service data information.

11. A system for acquiring a service by a portable device, comprising:

a portable device which is configured to, when a user uses a User Interface (UI) to acquire a service, receive a checking application containing information of a file to be checked from the UI which sends the checking application after identifying the portable device; acquire the file according to the information of the file; return identification information of at least one slice of the file to the UI; receive data information of each slice in the at least one slice returned by the UI; match the received data information of the each slice with corresponding data information of each slice saved in the portable device itself, and when they are matched successfully, determine that the UI is legal and acquire the service through the UI, otherwise, refuse to use the UI; and further configured to: acquire attribute information of the service saved in itself according to the service to be acquired, and acquire a condition list for the attribute information of the service saved in itself, wherein the condition list contains condition information for verifying each type of attribute information; judqe whether the attribute information of the service meets corresponding condition information for the attribute information in the condition list; and when the attribute information of the service meets the corresponding condition information for the attribute information in the condition list, determine to authenticate permission to use the service in a process of acquiring the service; otherwise, determine not to authenticate the permission to use the service in the process of acquiring the service;

the UI, which is configured to send the checking application containing the information of the file to be checked after identifying the portable device, receive the identification information of the at least one slice of the file returned by the portable device; compute data information of the each slice according to a first algorithm saved in the UI itself and the identification information of the each slice; and send the data information of the each slice to the portable device.

* * * * *